United States Patent

Miyasaka (10) Patent No.: US 10,625,677 B2
(45) Date of Patent: Apr. 21, 2020

(54) DISPLAY DEVICE AND INTERIOR MEMBER UNIT

(71) Applicant: Yazaki Corporation, Tokyo (JP)

(72) Inventor: Hideki Miyasaka, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/797,084

(22) Filed: Oct. 30, 2017

(65) Prior Publication Data
US 2018/0126908 A1 May 10, 2018

(30) Foreign Application Priority Data

Nov. 7, 2016 (JP) ................................ 2016-217106

(51) Int. Cl.
*B60R 1/00* (2006.01)
*B60K 35/00* (2006.01)
(Continued)

(52) U.S. Cl.
CPC .............. *B60R 1/007* (2013.01); *B60K 35/00* (2013.01); *B60K 37/02* (2013.01); *G03B 21/145* (2013.01); *G03B 21/147* (2013.01); *G03B 21/28* (2013.01); *B60K 2370/155* (2019.05); *B60K 2370/21* (2019.05); *B60K 2370/334* (2019.05); *B60R 2300/202* (2013.01); *B60R 2300/205* (2013.01);
(Continued)

(58) Field of Classification Search
CPC .......... G03B 21/28; G02B 27/01–0198; H04N 9/31–3197
See application file for complete search history.

(56) References Cited

U.S. PATENT DOCUMENTS

| | | | |
|---|---|---|---|
| 5,204,666 A * | 4/1993 | Aoki | B60K 37/02 345/9 |
| 2003/0020880 A1* | 1/2003 | Knoll | B60R 1/00 353/13 |

(Continued)

FOREIGN PATENT DOCUMENTS

| | | |
|---|---|---|
| JP | 60-107916 U | 7/1985 |
| JP | 2008-009654 A | 1/2008 |
| JP | 2013-180713 A | 9/2013 |

OTHER PUBLICATIONS

Communication dated Nov. 20, 2018 from the Japanese Patent Office in counterpart Application No. 2016-217106.

(Continued)

*Primary Examiner* — Cara E Rakowski
*Assistant Examiner* — Christopher A Lamb, II
(74) *Attorney, Agent, or Firm* — Sughrue Mion, PLLC (57) ABSTRACT

A display device applied to an instrument panel unit includes: a projection surface provided on a surface on a vehicle interior side of an interior member provided on the vehicle interior side of a vehicle and on a front side in a vehicle front-back direction, the interior member extending along a vehicle width direction; a projector including a projection unit configured to project an image; and a holding unit configured to hold the projector by the interior member in a positional relationship where at least a part of the projection unit is located on the projection surface side of the interior member, and the image from the projection unit is projected onto the projection surface.

12 Claims, 2 Drawing Sheets

(51) Int. Cl.
    *B60K 37/02*     (2006.01)
    *G03B 21/14*     (2006.01)
    *G03B 21/28*     (2006.01)
    *G02B 27/01*     (2006.01)

(52) U.S. Cl.
    CPC ........ *B60R 2300/802* (2013.01); *G02B 27/01* (2013.01)

(56) References Cited

U.S. PATENT DOCUMENTS

| | | | | |
|---|---|---|---|---|
| 2006/0203351 A1* | 9/2006 | Kageyama | .......... | G02B 27/0101 359/630 |
| 2008/0238814 A1* | 10/2008 | Ishikawa | ............ | G02B 27/0101 345/7 |
| 2010/0225884 A1* | 9/2010 | Kim | ....................... | G03B 21/28 353/14 |
| 2016/0142689 A1* | 5/2016 | Karikomi | ............... | G01D 11/28 348/745 |
| 2017/0203691 A1* | 7/2017 | Chou | ........................ | B60R 1/00 |

OTHER PUBLICATIONS

Communication dated Feb. 19, 2019, issued by the Japan Patent Office in corresponding Japanese Application No. 2016-217106.

\* cited by examiner

DISPLAY DEVICE AND INTERIOR MEMBER UNIT

CROSS-REFERENCE TO RELATED APPLICATION(S)

The present application claims priority to and incorporates by reference the entire contents of Japanese Patent Application No. 2016-217106 filed in Japan on Nov. 7, 2016.

BACKGROUND OF THE INVENTION

1. Field of the Invention

The present invention relates to a display device and an interior member unit.

2. Description of the Related Art

For example, Japanese Patent Application Laid-open No. 2008-9654 discloses a vehicle-use display device that captures an image around an own vehicle and projects an image that becomes a blind spot from the interior of the vehicle from a projector into the interior of the vehicle, as a known display device applied to a vehicle.

Incidentally, the vehicle-use display device described in Japanese Patent Application Laid-open No. 2008-9654 described above has more room for improvement in the respect of, for example, an image projection on an interior member of a vehicle.

SUMMARY OF THE INVENTION

The present invention has been made considering the above circumstances, and an object thereof is to provide a display device that can appropriately project an image onto an interior member of a vehicle, and an interior member unit.

In order to solve the above mentioned problem and achieve the object, a display device according to one aspect of the present invention includes a projection surface provided on a surface on a vehicle interior side of an interior member provided on the vehicle interior side of a vehicle and on a front side in a vehicle front-back direction, the interior member extending along a vehicle width direction intersecting with the vehicle front-back direction; a projector including a projection unit configured to project an image; and a holding unit configured to hold the projector by the interior member, or a structural member to support the interior member on the vehicle interior side on a side opposite to the projection surface, in a positional relationship where at least a part of the projection unit is located on the projection surface side of the interior member, and the image from the projection unit is projected onto the projection surface.

According to another aspect of the present invention, in the display device, it is preferable that the projection unit includes a reflection unit configured to reflect projection light representing the image onto the projection surface.

According to still another aspect of the present invention, in the display device, it is preferable that the reflection unit includes a magnifying mirror configured to magnify and reflect the image represented by the projection light.

According to still another aspect of the present invention, in the display device, it is preferable that the reflection unit includes a freeform surface mirror configured to correct a distortion of the image represented by the projection light and reflect the image.

According to still another aspect of the present invention, in the display device, it is preferable that the interior member includes a hood unit located on the projection surface side of the interior member, the hood unit including an opening on the projection surface side, and the projector is configured to be incorporated into meter equipment provided in the hood unit.

According to still another aspect of the present invention, in the display device, it is preferable that the projection surface is provided on a side opposite to a driver's side of the vehicle relative to the center of the interior member in the vehicle width direction, and the projector projects, onto the projection surface, the image including blind-spot information on a passenger's side when viewed from the driver's side.

In order to achieve the object, an interior member unit according to still another aspect of the present invention includes an interior member provided on a vehicle interior side of a vehicle and on a front side in a vehicle front-back direction, the interior member extending along a vehicle width direction intersecting with the vehicle front-back direction; a projection surface provided on a surface on the vehicle interior side of the interior member; a projector including a projection unit configured to project an image; and a holding unit configured to hold the projector by the interior member in a positional relationship where at least a part of the projection unit is located on the projection surface side of the interior member, and the image from the projection unit is projected onto the projection surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention are described in detail hereinafter on the basis of the drawings. The invention is not limited to the embodiments. Moreover, constituent elements in the following embodiments include those that can be easily replaced by a person skilled in the art or those that are substantially the same.

First Embodiment

Figure 1:
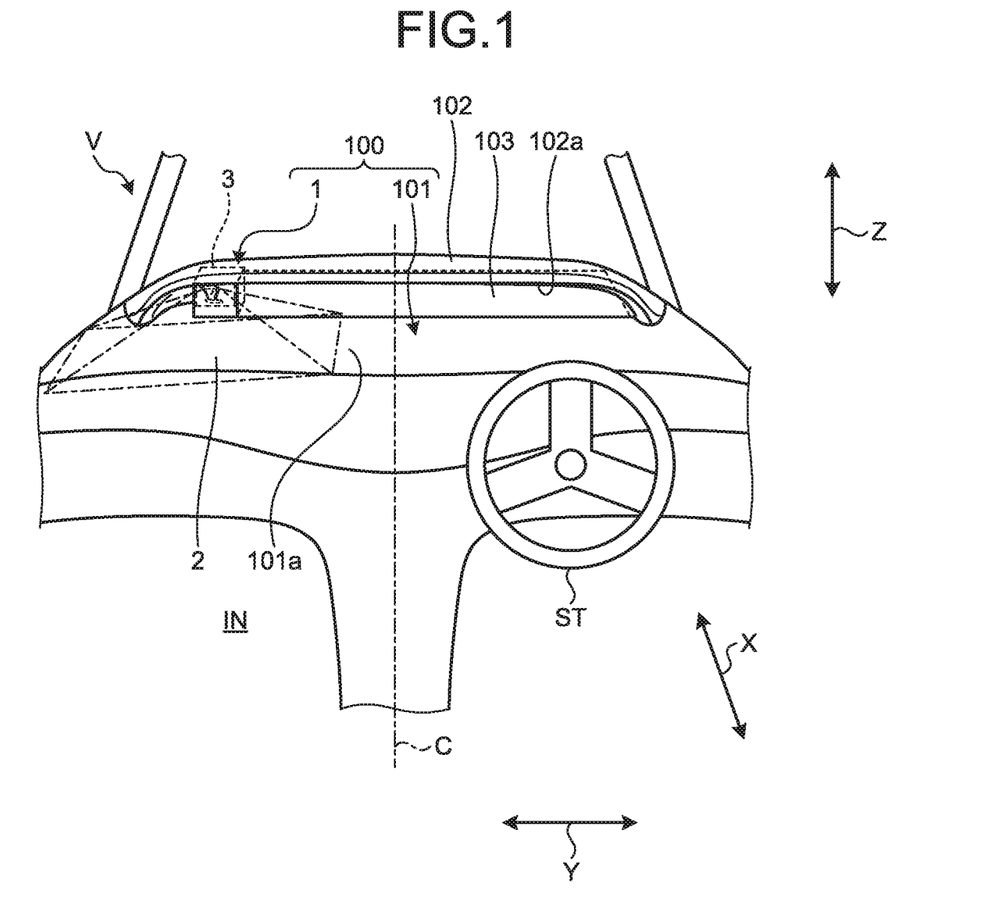
FIG. 1 is a partial schematic diagram illustrating a schematic configuration of a display device and an IP unit according to a first embodiment.
Figure 2:
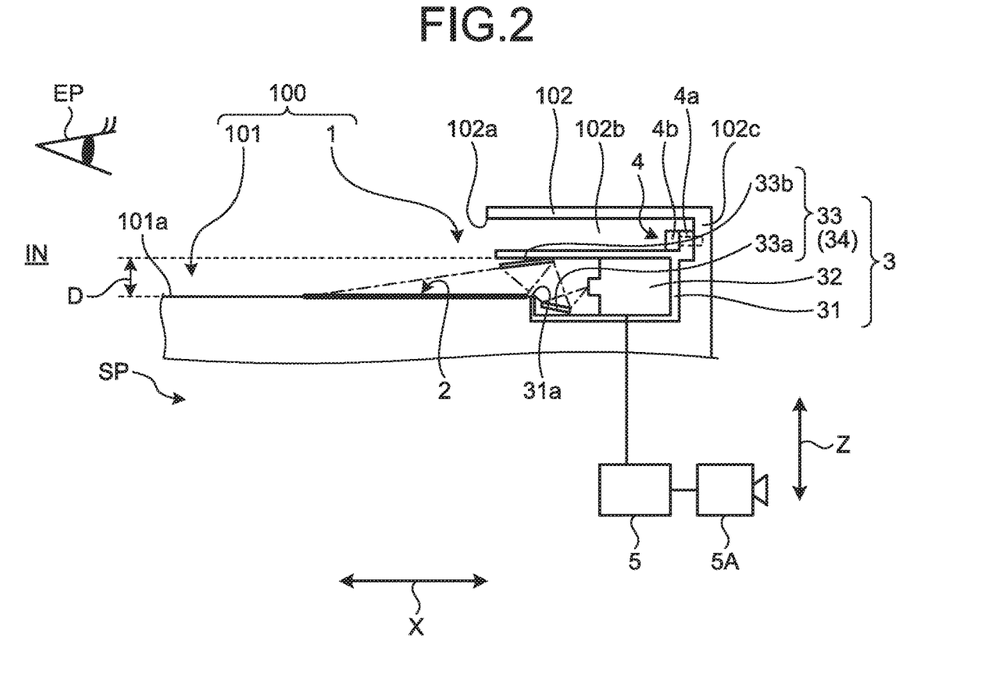
FIG. 2 is a schematic cross-sectional view illustrating a schematic configuration of the display device and the IP unit according to the first embodiment.

A display device 1 of the embodiment illustrated in FIGS. 1 and 2 is applied to an instrument panel unit (hereinafter may be abbreviated to "IP") 100 as an interior member unit of a vehicle V, and displays various images. In the following description, in the vehicle V to which the display device 1 and the IP unit 100 are applied, "vehicle front-back direction X" typically corresponds to the overall length direction of the vehicle V, and furthermore corresponds to a direction along the front-back straight-ahead direction of the vehicle V. "Vehicle width direction Y" typically corresponds to the overall width direction of the vehicle V, and corresponds to the vehicle lateral direction of the vehicle V. "Vehicle height direction Z" typically corresponds to the height direction of the vehicle V. The vehicle front-back direction X being a first direction, the vehicle width direction Y being a second direction, and the vehicle height direction Z being a third direction are orthogonal to one another. The vehicle front-back direction X and the vehicle width direction Y are along the horizontal direction, and the vehicle height direction Z along the vertical direction, in a state where the vehicle V is located on a horizontal plane. Moreover, in the following description, a side where the vehicle V goes ahead may be referred to as "front", and a side where the vehicle V goes back as "rear", in the vehicle front-back direction X. The left when facing the front in the vehicle front-back direction X may be referred to as "left", and the right when facing the front, in the vehicle front-back direction X as "right" in the vehicle width direction Y. The up side in the vertical direction may be referred to as "up", and the down side in the vertical direction as "down", in the vehicle height direction Z. The directions used in the following description are assumed to indicate directions in a state where units are assembled to one another, except where specifically noted.

The IP unit 100 includes an instrument panel (hereinafter may be abbreviated to "IP") 101, and the display device 1 that projects and displays various images on a projection surface 2 provided to the IP 101. The IP unit 100 is a unit with a display device, which achieves an appropriate image projection on the IP 101. The IP 101 is a member provided on a vehicle interior side IN where a driving seat and the like are provided in the vehicle V and on the front side in the vehicle front-back direction X, the member extending along the vehicle width direction Y intersecting with the vehicle front-back direction X. The IP 101 extends from the right end to the left end along the vehicle width direction Y on the vehicle interior side IN. The IP 101 is an interior member provided in a space portion on the vehicle interior side IN, exposed on the vehicle interior side IN, and is also a partition member that partitions an accommodation space portion SP that accommodates various components in between with a wall surface, on the front side in the vehicle front-back direction X, of a body of the vehicle V. Examples of components accommodated in the accommodation space portion SP include structures such as a reinforcement that supports, on the body, for example, a steering ST provided at a position facing the driving seat on the vehicle interior side IN to be operated by a driver, an air conditioning duct that can circulate air in its inside formed in a hollow shape, various wire harnesses, and electronic components. The configuration of the display device 1 applied to the IP unit 100 is described in detail below with reference to FIGS. 1 and 2. The illustration of the internal structure of the IP 101 is omitted in FIG. 2 (the same applies to FIG. 3 described below).

Specifically, the display device 1 includes the projection surface 2, a projector 3, a holding unit 4, and a controller 5.

The projection surface 2 is a screen provided to a projection surface-mounted surface 101a of the IP 101. The projection surface-mounted surface 101a is configured including a surface on the vehicle interior side IN of the IP 101 provided to the vehicle V, and furthermore, a surface on the most vehicle interior side IN of the IP 101. The projection surface-mounted surface 101a configures an interior surface of the IP 101. The projection surface 2 is an area where in the projection surface-mounted surface 101a, projection light representing an image is projected from the projector 3, and is set at any given location. Here the projection surface 2 is provided on a side opposite to the driver's side of the vehicle V relative to a center C of the IP 101 in the vehicle width direction Y, in other words, a side opposite to a side where the steering ST is provided. The projection surface 2 of the embodiment is provided in a substantially rectangular shape on the left side of the IP 101 in the vehicle width direction Y. Moreover, the projection surface 2 of the embodiment is located at a viewable position from an eye point EP assumed in advance, typically, on the up side in the vehicle height direction Z (the vertical direction) and on the rear side in the vehicle front-back direction X, on the IP 101. Here the eye point EP is typically assumed in advance to be located within what is called the eye range in the vehicle V to which the display device 1 and the IP unit 100 are applied. Here the eye range is the "eye range of the driver of an automobile" and corresponds to an area where the driver's eye point determined in advance according to the vehicle is located. The eye range is typically the statistical representation of the distribution of the location of the eyes of the driver in the vehicle V, and corresponds to, for example, an area including the location of the eyes of the driver at a predetermined rate (for example, 95%) with the driver seated in the driving seat. The projection surface-mounted surface 101a including the projection surface 2 of the embodiment is typically configured as a surface that does not transmit light. The projection surface 2 configures, for example, a diffusing or reflective screen on the projection surface-mounted surface 101a. When projection light representing an image enters the projection surface 2 from the projector 3, the projection surface 2 reflects the projection light toward the eye point EP, and causes the driver and the like to visually recognize the image presented by the projection light. For example, surface treatment such as micromachining, surface coating, or a resin sheet is applied to the projection surface 2 to excellently and specularly reflect, on the projection surface-mounted surface 101a, the projection light representing the image and projected from the projector 3. Here the eye point EP is assumed to be relative to the driver of the vehicle V, but is not limited to the driver and may be assumed to be relative to another passenger of the vehicle V.

The projector 3 projects an image, more specifically, projects projection light representing an image onto the projection surface 2 and shows the image of the projection light on the projection surface 2. The projector 3 includes a casing 31, a main unit 32, and a reflection unit 33. It is typically preferable that the projector 3 use what is called a short-throw projector to be placed as close to the projection surface-mounted surface 101a provided with the projection surface 2 as possible and achieve a close-range projection onto the projection surface 2. The projector 3 of the embodiment is configured in such a manner that the reflection unit 33 includes a middle mirror 33a as a first mirror and a last mirror 33b as a second mirror. The projector 3 achieves short focus by configuring a folded projection optical system with two reflection systems of the middle mirror 33a and the last mirror 33b, which configure the reflection unit 33, and a lens system such as a projection lens configuring the main unit 32.

The casing 31 is formed into a hollow box shape and accommodates the main unit 32 and the reflection unit 33 in an internal space portion thereof. An opening 31a serving as an optical path of projection light projected onto the projection surface 2 is formed in the casing 31. Here the opening 31a is formed in a surface of the casing 31 on the rear side in the vehicle front-back direction X.

The main unit 32 is a projector body that emits projection light representing an image, and is configured including a light source such as an LED element, a display panel such as a microdisplay forming an original image of an image projected, and a lens system such as a projection lens (projection lens or image forming lens). The main unit 32 is placed in the casing 31, and emits projection light representing an image toward the opening 31a on the up side in the vehicle height direction Z.

The reflection unit 33 configures the reflection system that reflects projection light, representing an image and emitted from the main unit 32, toward the projection surface 2, and is configured here including the middle mirror 33a and the last mirror 33b as described above. The middle mirror 33a is a middle folded mirror that totally reflects projection light, representing an image and emitted from the main unit 32, toward the last mirror 33b. The last mirror 33b is the last reflection mirror that totally reflects, toward the projection surface 2, the projection light from the middle mirror 33a, that is, the projection light representing the image, emitted from the main unit 32, and totally reflected by the middle mirror 33a. The last mirror 33b of the embodiment is a magnifying mirror that magnifies and reflects the image represented by the projection light, and is also a freeform surface mirror that corrects the distortion of the image represented by the projection light, and reflects the image. The last mirror 33b that functions as the magnifying mirror is formed as a concave or convex mirror. The last mirror 33b that functions as the magnifying mirror magnifies an image represented by the projection light after being reflected by the last mirror 33b in such a manner as to be relatively larger than an image represented by the projection light before being reflected by the last mirror 33b, and reflects the image. Moreover, the last mirror 33b that functions as the freeform surface mirror is formed as a mirror of a shape that is asymmetrical about the optical axis, unlike a spherical or parabolic mirror, and is also called a non-spherical mirror. In other words, the last mirror 33b is formed as a mirror of a shape that is concave or convex, and asymmetrical about the optical axis. The last mirror 33b that functions as the freeform surface mirror is formed into a shape in accordance with the surface shape of the projection surface 2 and the geometric positional relationship of the last mirror 33b with the projection surface 2. The last mirror 33b optically corrects a distortion in such a manner that an image represented by projection light and shown on the projection surface 2 has a desired shape, when the projection light is reflected toward the projection surface 2. The reflection unit 33 of the embodiment configured as described above, more specifically, the last mirror 33b configuring the reflection unit 33, configures a last projection unit 34 that projects an image onto the projection surface 2. In other words, the projector 3 includes the projection unit 34 that projects an image. In the embodiment, the projection unit 34 is configured including the reflection unit 33.

The holding unit 4 holds the projector 3 by the IP 101, or a structural member that supports the IP 101 on the vehicle interior side IN on a side opposite to the projection surface 2, that is, on the accommodation space portion SP side, in a positional relationship where an image from the projector 3 is projected onto the projection surface 2. The holding unit 4 of the embodiment holds the projector 3 by the IP 101. The holding unit 4 of the embodiment holds the projector 3 by the IP 101 in a positional relationship where at least a part of the projection unit 34, here, the last mirror 33b of the reflection unit 33 configuring the projection unit 34, is located on the projection surface 2 side of the IP 101, and an image from the last mirror 33b is projected onto the projection surface 2. In other words, the holding unit 4 holds the projector 3 by the IP 101 in a positional relationship where at least a part of the projection unit 34, here, the last mirror 33b, is located on a side opposite to the accommodation space portion SP of the projection surface-mounted surface 101a, provided with the projection surface 2, of the IP 101, that is, on a side where the eye point EP is located. The holding unit 4 holds the whole projector 3 including the casing 31, the main unit 32, and the reflection unit 33 on a surface on the projection surface-mounted surface 101a side of the IP 101, that is, a surface on the up side in the vertical direction (the vehicle height direction Z). The holding unit 4 of the embodiment holds the projector 3 at a position on the front side in the vehicle front-back direction X with respect to the projection surface 2, in a positional relationship where the last mirror 33b and a part of the casing 31 where the last mirror 33b is accommodated protrude upward in the vertical direction from the projection surface-mounted surface 101a. In the projector 3 that is being held by the holding unit 4, the last mirror 33b of the reflection unit 33 is located on the up side in the vertical direction, and the middle mirror 33a on the down side in the vertical direction.

Here the IP 101 of the embodiment includes a hood unit 102 located on the projection surface 2 side, that is, on the projection surface-mounted surface 101a, of the IP 101, in which an opening 102a is formed on the projection surface 2 side. The holding unit 4 of the embodiment holds the projector 3 in an internal space portion 102b of the hood unit 102. The internal space portion 102b opens toward the projection surface 2, that is, toward the rear in the vehicle front-back direction X, via the opening 102a. In the IP 101, the hood unit 102 extends from the right end to the left end along the vehicle width direction Y, and the internal space portion 102b similarly extends from the right end to the left end along the vehicle width direction Y. The hood unit 102 is provided with meter equipment 103 that displays various types of vehicle information (not illustrated) related to the vehicle V, together with the projector 3, in the internal space portion 102b. The vehicle information displayed by the meter equipment 103 is information such as a vehicle speed, an accumulated travel distance, a coolant temperature, the output speed of a power source for driving, the fuel level, battery storage amount, various warning lamps (warning lamps, what are called telltales), a shift position indicator, and a symbol for turn signals. The meter equipment 103 is provided on the driver's side in the vehicle width direction Y, in other words, the side provided with the steering ST, that is, on the right side in the vehicle width direction Y, in the internal space portion 102b of the hood unit 102, and is held by the IP 101 via various holding mechanisms. The projector 3 is provided on the side opposite to the driver's side of the vehicle V relative to the center C of the IP 101 in the vehicle width direction Y, in other words, the side opposite to the side provided with the steering ST, that is, on the left side in the vehicle width direction Y, in the internal space portion 102b of the hood unit 102, as in the projection surface 2, and is held by the IP 101 via the holding unit 4.

The holding unit 4 of the embodiment is configured including, for example, a bracket portion 4a formed protruding from the casing 31 of the projector 3, and a fastening member 4b such as a bolt provided to the bracket portion 4a.

The bracket portion 4a is fastened by the fastening member 4b to a rear plate 102c of the hood unit 102, and accordingly the holding unit 4 holds the projector 3 by the IP 101 in such a positional relationship as described above. Here the holding unit 4 holds the projector 3 by the IP 101 in a positional relationship where the whole projector 3 is accommodated adjacently to the left of the meter equipment 103 in the vehicle width direction Y in the internal space portion 102b of the hood unit 102. The projector 3 is exposed at the opening 31a from the opening 102a of the hood unit 102 toward the projection surface 2 in a state of being held by the holding unit 4. The holding unit 4 preferably holds the projector 3 in such a manner that a distance D between the last mirror 33b and the projection surface-mounted surface 101a along the vehicle height direction Z (the vertical direction) is within, for example, approximately 100 mm.

The controller 5 integrally controls the units of the projector 3 and controls an image displayed by the projector 3. The controller 5 is configured including electronic circuits consisting principally of known microcomputers including a CPU, ROM, RAM, and an interface. The controller 5 is electrically connected to the projector 3 via the interface. The controller 5 may be connected to the projector 3 via the above-mentioned wire harness or the like, or may be accommodated in the casing 31 of the projector 3 and configured integrally with the projector 3. Moreover, the controller 5 may serve multiple duty as, for example, an ECU (Electronic Control Unit) that integrally controls the overall vehicle V, or may be configured separately from the ECU to exchange information such as a detection signal, a drive signal, and a control command with each other. The controller 5 executes control programs stored in the ROM, RAM, and the like to output control signals to the projector 3, control the operation of the projector 3, and execute various processes for the projector 3 to control an image to be shown on the projection surface 2. The controller 5 is electrically connected to, for example, the outside of the vehicle V, that is, an imaging device 5A that captures an image of the outside of the vehicle. The controller 5 controls the projector 3 on the basis of an image captured by the imaging device 5A, and causes the projector 3 to project, onto the projection surface 2, an image including blind-spot information on the passenger's side when viewed from the driver's side of the vehicle V, here, on the left side in the vehicle width direction Y.

In the display device 1 and the IP unit 100 that have been described above, an image is projected from the projection unit 34 of the projector 3 held with the holding unit 4 by the IP 101 onto the projection surface 2 provided on the projection surface-mounted surface 101a on the vehicle interior side IN of the IP 101. Consequently, the display device 1 and the IP unit 100 can be configured in such a manner that there are hardly likely obstacle objects such as a passenger, baggage, and the like of the vehicle V on the optical path of projection light from the projector 3 to the projection surface 2. Accordingly, the display device 1 and the IP unit 100 can be configured in such a manner that it is difficult for the projection light to be blocked before reaching the projection surface 2. Moreover, both of the projection surface 2 and the projector 3 that projects an image onto the projection surface 2 are provided to the IP 101. Accordingly, even if, for example, the vehicle V vibrates, both of the projection surface 2 and the projector 3 vibrate together with the IP 101. Hence, the display device 1 and the IP unit 100 can be configured in such a manner that it is difficult to change the relative positional relationship between the projection surface 2 and the projector 3. Consequently, the display device 1 and the IP unit 100 can be configured in such a manner that it is difficult for an image projected on the projection surface 2 to blur. Moreover, the display device 1 and the IP unit 100 can be configured in such a manner that there is no component of the display device 1 except the projection surface 2 on the up side in the vehicle height direction Z (the vertical direction) of the IP 101 that has a tendency to be provided with an air bag and the like, and on a surface on the rear side in the vehicle front-back direction X (a surface that can be viewed from the eye point EP). Accordingly, various images can be projected onto the projection surface 2 without inhibiting the operation of the air bag. As a result, the display device 1 and the IP unit 100 can appropriately project an image onto the IP 101 of the vehicle V.

Furthermore, the holding unit 4 holds the projector 3 by the IP 101 in such a manner that a part of the reflection unit 33 configuring the projection unit 34, here, the last mirror 33b, is located on the projection surface 2 side of the IP 101. Accordingly, the display device 1 and the IP unit 100 that have been described above can project projection light representing an image onto the projection surface 2 via the last mirror 33b. As a result, the display device 1 and the IP unit 100 can appropriately project the projection light representing the image onto the projection surface 2.

Furthermore, the display device 1 and the IP unit 100 that have been described above are configured in such a manner that the reflection unit 33 includes the last mirror 33b functioning as the magnifying mirror. Accordingly, it is possible to magnify an image represented by projection light emitted from the main unit 32 to a desired size and project the image onto the projection surface 2. The image can be appropriately projected onto the IP 101 of the vehicle V also in this respect.

Furthermore, the display device 1 and the IP unit 100 that have been described above are configured in such a manner that the reflection unit 33 includes the last mirror 33b functioning as the freeform surface mirror. Accordingly, it is possible to correct the distortion of an image represented by projection light emitted from the main unit 32 and project the image onto the projection surface 2. The image can be appropriately projected onto the IP 101 of the vehicle V also in this respect.

Furthermore, the display device 1 and the IP unit 100 that have been described above can reflect projection light emitted from the main unit 32 by the middle mirror 33a and the last mirror 33b and project the projection light onto the projection surface 2. The display device 1 and the IP unit 100 can adjust the optical path of the projection light from the projector 3 to the projection surface 2 by combining the middle mirror 33a and the last mirror 33b. Accordingly, the positional relationship between the optical axis direction of the projection light emitted from the main unit 32 (the emission direction) and the projection surface 2 can be freely adjusted. For example, the positional relationship between the optical axis direction and the projection surface 2 can be made nearly parallel. Consequently, the display device 1 and the IP unit 100 may be able to, for example, reduce a protrusion of the projector 3 upward in the vertical direction (the vehicle height direction Z) from the projection surface-mounted surface 101a.

Furthermore, in the display device 1 and the IP unit 100 that have been described above, the projection surface 2 is provided on the side opposite to the driver's side of the vehicle V relative to the center C of the IP 101 in the vehicle width direction Y, and the projector 3 projects, onto the projection surface 2, for example, an image including blind-spot information on the passenger's side when viewed from the driver's side. Consequently, the display device 1 and the IP unit 100 can project, onto, for example, the projection surface 2 of the IP 101, an image of the outside of the passenger seat that has a tendency to easily become a blind spot from the driver's side. Accordingly, for example, the safety of the vehicle V to which the display device 1 and the IP unit 100 are applied can be improved.

The display device 1 and the IP unit 100 that have been described above may be configured in such a manner that the projector 3 is incorporated in the meter equipment 103 provided in the hood unit 102. In this case, the display device 1 and the IP unit 100 can share the controller 5 between the projector 3 and the meter equipment 103 and accordingly can reduce the number of components of the whole vehicle V, and can reduce, for example, the manufacturing cost. In this case, the IP unit 100 may be formed into a unit including the meter equipment 103.

Second Embodiment

Figure 3:
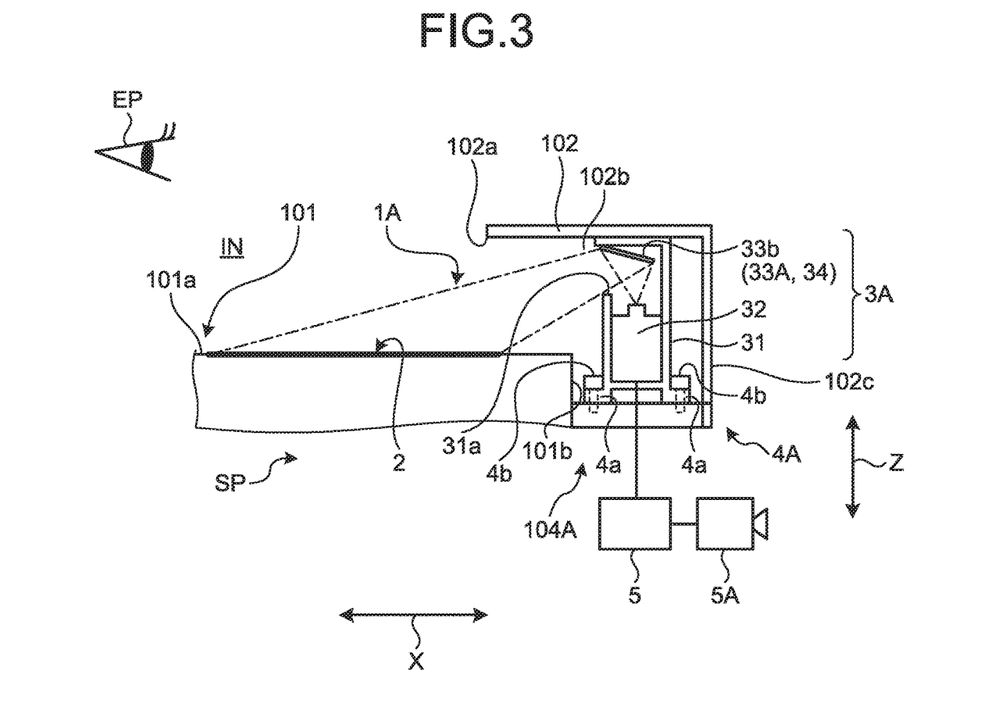
FIG. 3 is a schematic cross-sectional view illustrating a schematic configuration of a display device and an IP unit according to a second embodiment.

A display device according to a second embodiment is different from the first embodiment in the holding position of the projector. Common reference numerals are assigned to similar constituent elements to those of the above-mentioned embodiment, and also overlapping descriptions of common configurations, operations, and effects are omitted as much as possible.

A display device 1A of the embodiment illustrated in FIG. 3 is different from the above-mentioned display device 1 in the respects that the display device 1A does not configure the above-mentioned IP unit 100 and that a projector 3A is held by a reinforcement 104A as a structural member. Here the reinforcement 104A is a structural member that supports the IP 101 on the vehicle interior side IN on the side opposite to the projection surface 2, that is, on the accommodation space portion SP side. The reinforcement 104A may be made of a metal material or a resin material with high stiffness. The reinforcement 104A extends along the vehicle width direction Y on the accommodation space portion SP side of the IP 101. Both ends of the reinforcement 104A in the vehicle width direction Y is fixed to the body of the vehicle V. The reinforcement 104A extends from the right end to the left end along the vehicle width direction Y in the IP 101 in a state of being fixed to the body, and supports the IP 101 on the vehicle interior side IN of the body of the vehicle V. The display device 1A of the embodiment includes the projection surface 2, a projector 3A, a holding unit 4A, and the controller 5. The display device 1A is different from the above-mentioned display device 1 in the respects of including the projector 3A instead of the projector 3, and of including the holding unit 4A instead of the holding unit 4. The other configurations are substantially similar to those of the above-mentioned display device 1 although the shapes, sizes, and the like are slightly different.

The projector 3A is different from the above-mentioned projector 3 in the respect of including a reflection unit 33A instead of the reflection unit 33. The other configurations are substantially similar to those of the above-mentioned projector 3 although the shapes, sizes, and the like of the casing 31, the opening 102a, and the like are slightly different. The reflection unit 33A of the embodiment does not include the above-mentioned middle mirror 33a and is configured by the last mirror 33b. The last mirror 33b configuring the reflection unit 33A reflects projection light, representing an image and emitted from the main unit 32, onto the projection surface 2. The last mirror 33b is a magnifying mirror and is also a freeform surface mirror as in the above description.

The reflection unit 33A configured by the last mirror 33b configures the projection unit 34.

The holding unit 4A of the embodiment holds the projector 3A by the reinforcement 104A via a mount opening 101b provided in the hood unit 102 of the IP 101. The holding unit 4A holds the projector 3A by the reinforcement 104A in a positional relationship where at least a part of the projection unit 34, here, the last mirror 33b of the reflection unit 33 configuring the projection unit 34, is located on the projection surface 2 side of the IP 101, and an image from the last mirror 33b is projected onto the projection surface 2. In other words, the holding unit 4A holds the projector 3A by the reinforcement 104A in a positional relationship where at least a part of the projection unit 34, here, the last mirror 33b, is located on the side opposite to the accommodation space portion SP of the projection surface-mounted surface 101a provided with the projection surface 2 in the IP 101, that is, the side where the eye point EP is located. The holding unit 4A is configured including, for example, the bracket portion 4a formed protruding from the casing 31 of the projector 3A, and the fastening member 4b such as a bolt provided to the bracket portion 4a, as in the holding unit 4. The bracket portion 4a is fastened by the fastening member 4b to the reinforcement 104A exposed from the mount opening 101b provided in the hood unit 102 of the IP 101. Accordingly, the holding unit 4A holds the projector 3A by the reinforcement 104A in the internal space portion 102b of the hood unit 102 in such a positional relationship as described above. The projector 3A is exposed at the opening 31a from the opening 102a of the hood unit 102 toward the projection surface 2 side in a state of being held by the holding unit 4A.

The display device 1A described above projects an image from the projection unit 34 of the projector 3A held with the holding unit 4A by the reinforcement 104A onto the projection surface 2 provided to the projection surface-mounted surface 101a on the vehicle interior side IN of the IP 101. Consequently, the display device 1A can be configured in such a manner that there are hardly likely obstacle objects such as a passenger, baggage, and the like of the vehicle V on the optical path of projection light from the projector 3A to the projection surface 2. Accordingly, the display device 1A can be configured in such a manner that it is difficult for the projection light to be blocked before reaching the projection surface 2. Moreover, both of the IP 101 provided with the projection surface 2 and the projector 3A are mounted on the reinforcement 104A being the relatively strong structural member that supports the IP 101 by the body of the vehicle V; accordingly, even if, for example, the vehicle V vibrates, both of the projection surface 2 and the projector 3A vibrate together with the IP 101. Hence, the display device 1A can be configured in such a manner that the relative positional relationship between the projection surface 2 and the projector 3A is difficult to change. Consequently, the display device 1A can be configured in such a manner that an image projected on the projection surface 2 is difficult to blur. Moreover, the display device 1A can project various images onto the projection surface 2 without, for example, inhibiting the operation of an air bag. As a result, the display device 1A can appropriately project an image onto the IP 101 of the vehicle V.

The display device and the interior member unit according to embodiments of the above-mentioned present invention are not limited to the above-mentioned embodiments. Various modifications can be made within the scope described in the claims. The display device and the interior member unit according to the embodiment may be configured by appropriately combining the constituent elements of the embodiments described above and modifications.

The projectors 3 and 3A described above may not include the casing 31. For example, the main unit 32 and the reflection unit 33 may be held directly by the hood unit 102 of the IP 101, or the like via the holding units 4 and 4A. For example, the casing 31 and the hood unit 102 may partially serve multiple duty.

The projectors 3 and 3A described above have been described assuming to include the reflection unit 33. However, the projectors 3 and 3A are not limited to this configuration. The projectors 3 and 3A may not include the reflection unit 33, and may project an image directly onto the projection surface 2 from the main unit 32 not via a reflection member. In this case, the projection unit of the projectors 3 and 3A is configured by the last optical system in, for example, a projection lens that emits projection light to the outside of the main unit 32.

The reflection unit 33 described above has been described assuming to include the middle mirror 33a as the first mirror and the last mirror 33b as the second mirror. However, the configuration is not limited to this. For example, two or more middle mirrors 33a may be disposed. Moreover, the last mirror 33b has been described assuming to be a magnifying mirror and a freeform surface mirror. However, the configuration is not limited to this. For example, the projector 3 may distort in advance an image itself represented by projection light emitted from the main unit 32 by image processing to form the image shown on the projection surface 2 into a desired shape.

The controller 5 described above has been described assuming to project, for example, an image including blind-spot information onto the projection surface 2. However, the configuration is not limited to this. An image including other information may be projected onto the projection surface 2.

The projection surface 2 described above has been described assuming to be provided in a substantially rectangular shape on the side opposite to the driver's side of the vehicle V relative to the center C of the IP 101 in the vehicle width direction Y. However, the projection surface 2 is not limited to this, and may be provided on a surface of the IP 101 on the vehicle interior side IN.

The holding units 4 and 4A described above have been described assuming to be configured including the bracket portion 4a and the fastening member 4b such as a bolt. However, the holding units 4 and 4A are not limited to this configuration. The holding unit may be configured including, for example, a holding claw portion formed on the projector 3, and a holding recess formed in the IP 101 and the reinforcement 104A, with which the holding claw portion is engaged, to hold the projector 3 by the IP 101 and the reinforcement 104A via the holding claw portion and the holding recess.

The holding units 4 and 4A described above have been described assuming to hold the projector 3 in the internal space portion 102b of the hood unit 102 of the IP 101. However, the configuration is not limited to this. In other words, the IP 101 may be configured without the hood unit 102.

A display device and an interior member unit according to the embodiment exert an effect that an image can be appropriately projected onto an interior member of a vehicle since the image is projected onto a projection surface provided on a surface, on a vehicle interior side, of the interior member from a projection unit of a projector held with a holding unit by the interior member or a structural member that supports the interior member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle having a windshield, comprising:
    a projection surface directly provided on a surface on a vehicle interior side of an interior member provided on the vehicle interior side of a vehicle and on a front side in a vehicle front-back direction, the interior member extending along a vehicle width direction intersecting with the vehicle front-back direction and being independent of the windshield;
    a projector including a projection unit configured to project an image; and
    a holding unit configured to hold the projector by the interior member, or a structural member to support the interior member on the vehicle interior side on a side opposite to the projection surface, in a positional relationship where at least a part of the projection unit is located on the projection surface side of the interior member,
    wherein the projection unit projects the image onto the projection surface in a downward direction towards a floor of the vehicle,
    the interior member includes a hood unit located on the projection surface side of the interior member, the hood unit including an opening on the projection surface side, and
    the projector is configured to be incorporated into meter equipment provided in the hood unit.

2. The display device according to claim 1, wherein the projection unit includes a reflection unit configured to reflect projection light representing the image onto the projection surface.

3. The display device according to claim 2, wherein the reflection unit includes a magnifying mirror configured to magnify and reflect the image represented by the projection light.

4. The display device according to claim 3, wherein the reflection unit includes a freeform surface mirror configured to correct a distortion of the image represented by the projection light and reflect the image.

5. The display device according to claim 2, wherein the reflection unit includes a freeform surface mirror configured to correct a distortion of the image represented by the projection light and reflect the image.

6. The display device according to claim 2, wherein the projection surface is provided on a side opposite to a driver's side of the vehicle relative to the center of the interior member in the vehicle width direction, and
    the projector projects, onto the projection surface, the image including blind-spot information on a passenger's side when viewed from the driver's side.

7. The display device according to claim 1, wherein the projection surface is provided on a side opposite to a driver's side of the vehicle relative to the center of the interior member in the vehicle width direction, and
    the projector projects, onto the projection surface, the image including blind-spot information on a passenger's side when viewed from the driver's side.

8. The display device according to claim 1, wherein the holding unit is configured to hold the projector by the interior member in a positional relationship where at least a part of the projection unit is located on the projection surface side of the interior member, and the image from the projection unit is projected onto the projection surface.

9. The display device according to claim 1, wherein the projection surface is provided on an instrument panel.

10. The display device according to claim 1, wherein the projector is provided on a side opposite to a driver's side of the vehicle relative to the center of the interior member in the vehicle width direction.

11. An interior member unit comprising:
an interior member provided on a vehicle interior side of a vehicle having a windshield and on a front side in a vehicle front-back direction, the interior member extending along a vehicle width direction intersecting with the vehicle front-back direction and being independent of the windshield;
a projection surface directly provided on a surface on the vehicle interior side of the interior member;
a projector including a projection unit configured to project an image; and
a holding unit configured to hold the projector by the interior member in a positional relationship where at least a part of the projection unit is located on the projection surface side of the interior member,
wherein the projection unit projects the image onto the projection surface in a downward direction towards a floor of the vehicle,
the interior member includes a hood unit located on the projection surface side of the interior member, the hood unit including an opening on the projection surface side, and
the projector is configured to be incorporated into meter equipment provided in the hood unit.

12. A display device for a vehicle having a windshield, comprising:
a projection surface directly provided on a surface on a vehicle interior side of an interior member provided on the vehicle interior side of a vehicle and on a front side in a vehicle front-back direction, the interior member extending along a vehicle width direction intersecting with the vehicle front-back direction and being independent of the windshield;
a projector including a projection unit configured to project an image; and
a holding unit configured to hold the projector by the interior member, or a structural member to support the interior member on the vehicle interior side on a side opposite to the projection surface, in a positional relationship where at least a part of the projection unit is located on the projection surface side of the interior member, and the image from the projection unit is projected onto the projection surface,
wherein the projection surface does not transmit light,
the projection unit projects the image onto the projection surface in a downward direction towards a floor of the vehicle,
the interior member includes a hood unit located on the projection surface side of the interior member, the hood unit including an opening on the projection surface side, and
the projector is configured to be incorporated into meter equipment provided in the hood unit.

* * * * *